United States Patent
Sugimoto et al.

(10) Patent No.: US 9,685,788 B2
(45) Date of Patent: Jun. 20, 2017

(54) ELECTRIC POWER CONTROL METHOD AND ELECTRIC POWER CONTROL DEVICE

(71) Applicant: Panasonic Intellectual Property Management Co., Ltd., Osaka (JP)

(72) Inventors: Takahiro Sugimoto, Kyoto (JP); Masami Funakura, Osaka (JP); Wei Zhang, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 14/711,775

(22) Filed: May 14, 2015

(65) Prior Publication Data
US 2015/0340900 A1 Nov. 26, 2015

(30) Foreign Application Priority Data
May 21, 2014 (JP) .................. 2014-105492

(51) Int. Cl.
*H02J 7/00* (2006.01)
*H02J 3/32* (2006.01)
*H02J 3/14* (2006.01)

(52) U.S. Cl.
CPC ........ *H02J 3/32* (2013.01); *H02J 3/14* (2013.01); *H02J 2003/146* (2013.01);
(Continued)

(58) Field of Classification Search
CPC ........ H02J 7/00; H02J 3/32; H02J 3/14; H02J 2003/146; Y02B 70/3225; Y04S 20/222; Y04S 20/224
(Continued)

(56) References Cited

U.S. PATENT DOCUMENTS 4,345,162 A * 8/1982 Hammer ............ G05D 23/1913
                                                       307/35
4,620,283 A * 10/1986 Butt .................. H02J 3/14
                                                       307/35
(Continued)

FOREIGN PATENT DOCUMENTS

JP   2000341861 A * 12/2000
JP   2009240054 A * 10/2009
(Continued)

OTHER PUBLICATIONS

Toshimitsu et al., Machine Translation of Japanese Patent Document No. JP-20013-099174, machine translated by JPO website, translated on Dec. 11, 2016, 21 pages.*

*Primary Examiner* — Phallaka Kik
(74) *Attorney, Agent, or Firm* — Greenblum & Bernstein, P.L.C.

(57) ABSTRACT

An electric power control method for an electric power load and an electric power storage device including assigning one of a peak shaving control or other services to at least one of time slots that are divided by a specific time unit, obtaining a consumption power of the electric power load of each of the time slots, determining power-purchase electric power according to the consumption power of each of the time slots, restricting a consumption power of the electric power load at one or more peak slots where the consumption power of the electric power load is more than or equal to a target power-purchase electric power upper limit, restricting the restricted consumption power of the electric power load and discharging the electric power storage device at one or more peak slots if the restricted consumption power of the electric power load is more than or equal to a target power-purchase electric power upper limit and the peak shaving is assigned.

11 Claims, 8 Drawing Sheets

(52) U.S. Cl.
CPC .......... *Y02B 70/3225* (2013.01); *Y04S 20/222* (2013.01); *Y04S 20/224* (2013.01)

(58) Field of Classification Search
USPC ................................ 320/134, 110, 155, 160
See application file for complete search history.

(56) References Cited

U.S. PATENT DOCUMENTS

| | | | | |
|---|---|---|---|---|
| 4,731,547 | A * | 3/1988 | Alenduff | H02J 3/48 290/2 |
| 4,809,516 | A * | 3/1989 | Jones | F24D 11/0214 165/236 |
| 4,909,041 | A * | 3/1990 | Jones | F24D 11/0214 62/157 |
| 5,095,715 | A * | 3/1992 | Dudley | F24D 17/02 237/2 B |
| 5,500,561 | A * | 3/1996 | Wilhelm | H02J 1/06 307/48 |
| 8,219,258 | B1 * | 7/2012 | Almeida | H02J 3/14 307/34 |
| 9,511,675 | B2 * | 12/2016 | Yonetani | B60L 11/1838 |
| 9,594,363 | B2 * | 3/2017 | Almeida | H02J 3/14 |
| 2007/0271810 | A1 * | 11/2007 | Kelley | D06F 58/20 34/93 |
| 2008/0272934 | A1 * | 11/2008 | Wang | H02J 3/14 340/870.11 |
| 2009/0312885 | A1 * | 12/2009 | Buiel | H02J 3/32 700/297 |
| 2010/0019574 | A1 * | 1/2010 | Baldassarre | H02J 3/14 307/23 |
| 2010/0206869 | A1 * | 8/2010 | Nelson | F24D 11/02 219/494 |
| 2012/0158198 | A1 * | 6/2012 | Black | H02J 3/14 700/291 |
| 2012/0271475 | A1 * | 10/2012 | Wang | H02J 3/14 700/295 |
| 2013/0151319 | A1 * | 6/2013 | Pan | H02J 3/14 705/14.1 |
| 2013/0166080 | A1 * | 6/2013 | Furuta | G05B 15/02 700/286 |
| 2014/0111006 | A1 * | 4/2014 | Baldassarre | H02J 9/002 307/23 |
| 2014/0148923 | A1 * | 5/2014 | Yamada | H02J 3/14 700/12 |
| 2014/0184170 | A1 * | 7/2014 | Jeong | B60L 11/184 320/137 |
| 2015/0081122 | A1 * | 3/2015 | Yonetani | G06Q 50/06 700/291 |
| 2015/0234409 | A1 * | 8/2015 | Griner | G05F 1/66 700/291 |
| 2015/0268304 | A1 * | 9/2015 | Yonetani | H02J 3/32 320/134 |
| 2016/0218505 | A1 * | 7/2016 | Krupadanam | G06Q 10/06 |
| 2017/0069008 | A1 * | 3/2017 | Wang | H02J 3/14 |
| 2017/0071050 | A1 * | 3/2017 | Potts | H05B 37/0272 |

FOREIGN PATENT DOCUMENTS

| | | |
|---|---|---|
| JP | 2012-095424 | 5/2012 |
| JP | 2013099174 A * | 5/2013 |
| JP | 2013155945 A * | 8/2013 |

* cited by examiner

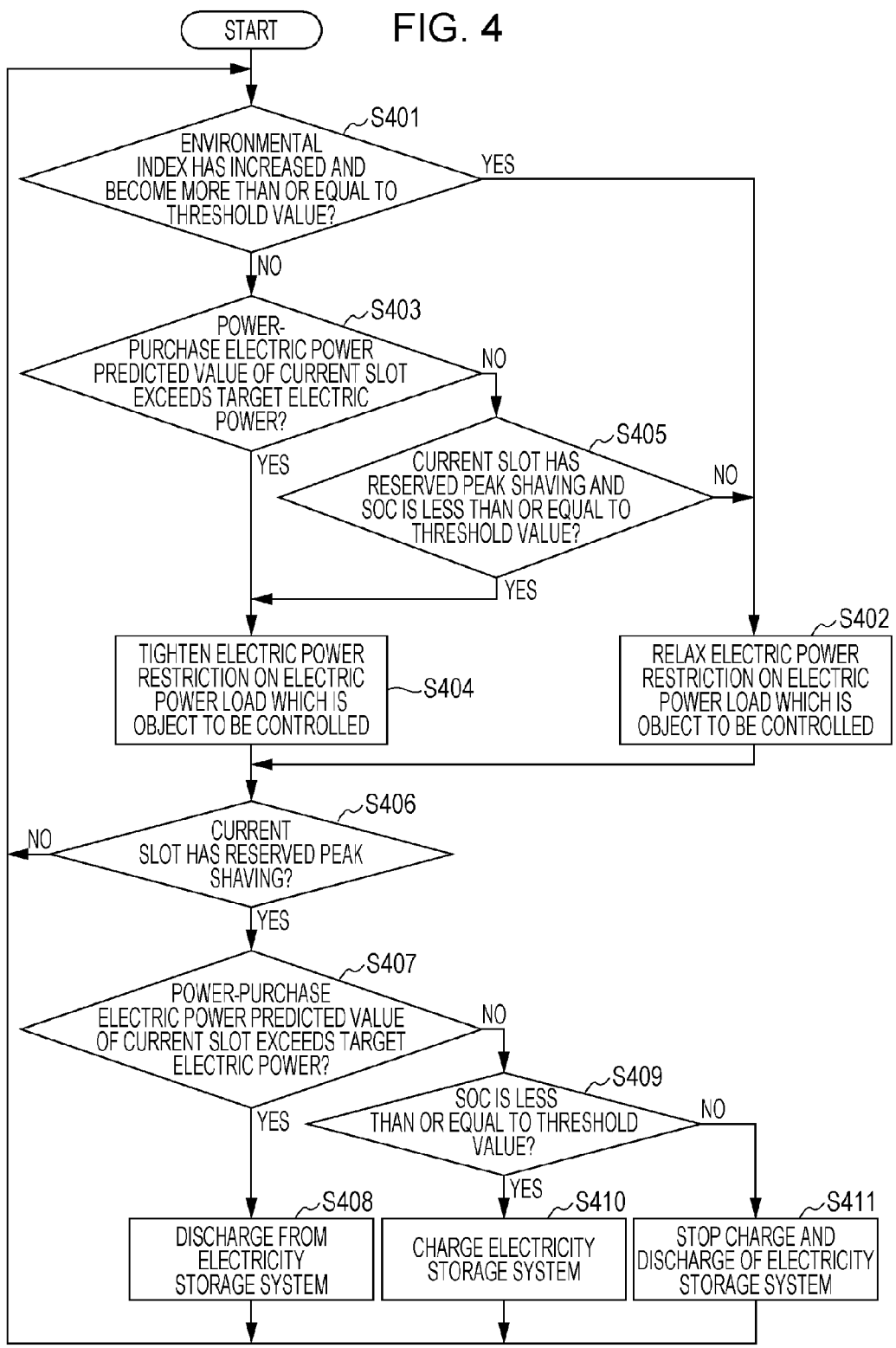

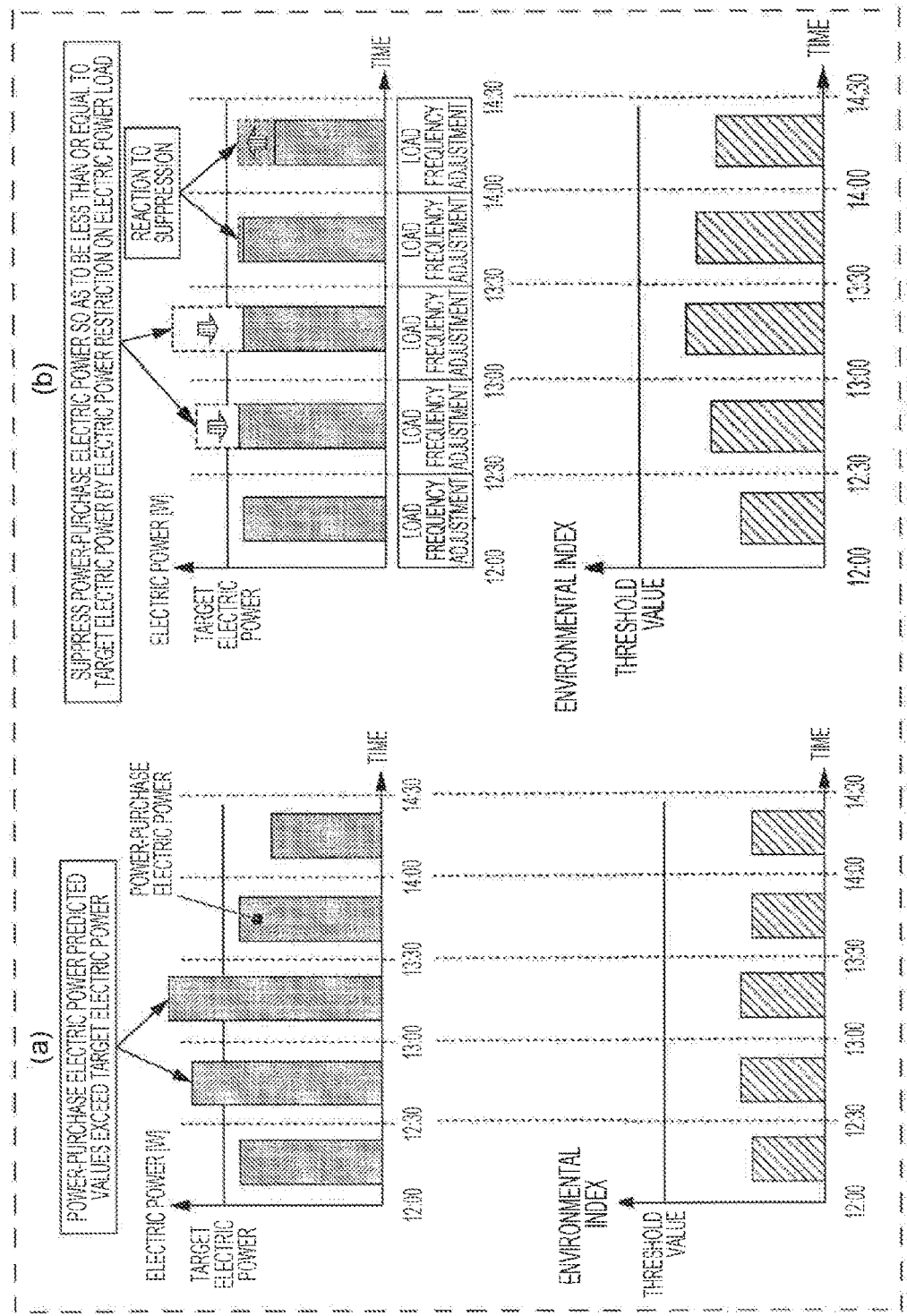

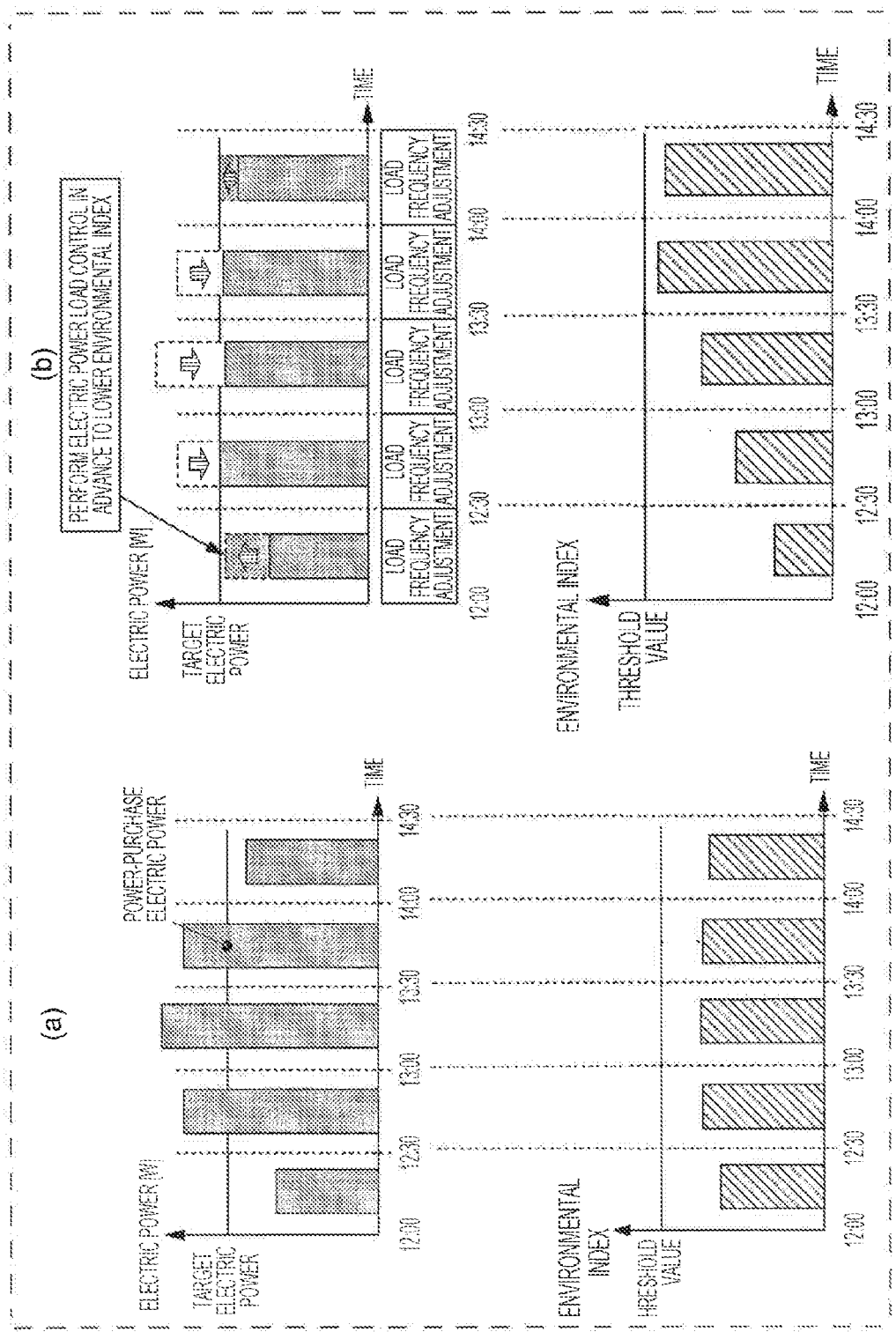

ELECTRIC POWER CONTROL METHOD AND ELECTRIC POWER CONTROL DEVICE

BACKGROUND

1. Technical Field

The present disclosure relates to an electric power control method for an electric power load and an electric power storage device disposed in customer.

2. Description of the Related Art

With the expansion of liberalization of electric power, it is expected that a customer will participate in various electric power services. For example, examples include electric power services such as suppression of a peak of power-purchase electric power (peak shaving), a negawatt transaction, and a load frequency adjustment (load frequency control) service. Moreover, an aggregator service that organizes a plurality of customers and performs transactions collectively with an electric power business operator is also possible. To implement these services, control of the power-purchase electric power (purchased electric power) on the customer's side is required.

In Japanese Unexamined Patent Application Publication No. 2012-95424, an electric power management system whose object is to reduce a power-purchase electric power peak by using an electricity storage system and an electrical apparatus is disclosed. In this electric power management system, by making the electricity storage system perform discharge when the power-purchase electric power from a system power source exceeds target electric power and performing load control of the electrical apparatus when the remaining charge capacity of the electricity storage system falls below a threshold value, the power-purchase electric power is prevented from exceeding the target electric power.

SUMMARY

However, in Japanese Unexamined Patent Application Publication No. 2012-95424, an adequate opportunity to make a distributed power source of, for example, an electricity storage system (electric power storage device) with high control capability participate in services other than peak shaving is not provided.

One non-limiting and exemplary embodiment provides an electric power control method of an electric power control device for making a distributed power source of, for example, an electricity storage system with high control capability actively participate in services other than peak shaving while leveling the power-purchase electric power of a customer connected to a system power source.

In one general aspect, the techniques disclosed here feature an electric power control method for an electric power load and an electric power storage device including assigning one of a peak shaving control or other services to at least one of time slots that are divided by a specific time unit, obtaining a consumption power of the electric power load for each of the time slots, determining power-purchase electric power according to the consumption power, restricting a consumption power of the electric power load at one or more peak slots where the consumption power of the electric power load is more than or equal to a target power-purchase electric power upper limit, restricting the restricted consumption power of the electric power load and discharging the electric power storage device at one or more peak slots if the restricted consumption power of the electric power load is more than or equal to a target power-purchase electric power upper limit and the peak shaving is assigned.

The electric power control device, the electric power control method, and the electric power control system of the present disclosure can perform services other than peak shaving by using a distributed power source and can perform peak shaving using the distributed power source when necessary.

It should be noted that general or specific embodiments may be implemented as a device, a system, a method, an integrated circuit, a computer program, a computer-readable recording medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a flowchart depicting processing of the power-purchase electric power reduction system when peak shaving is performed by using the electricity storage system;

FIG. 5A is a diagram depicting an example of peak shaving according to this embodiment;

FIG. 5D is a diagram depicting an example of peak shaving according to this embodiment.

DETAILED DESCRIPTION

Knowledge Obtained by the Inventors

Figure 1:
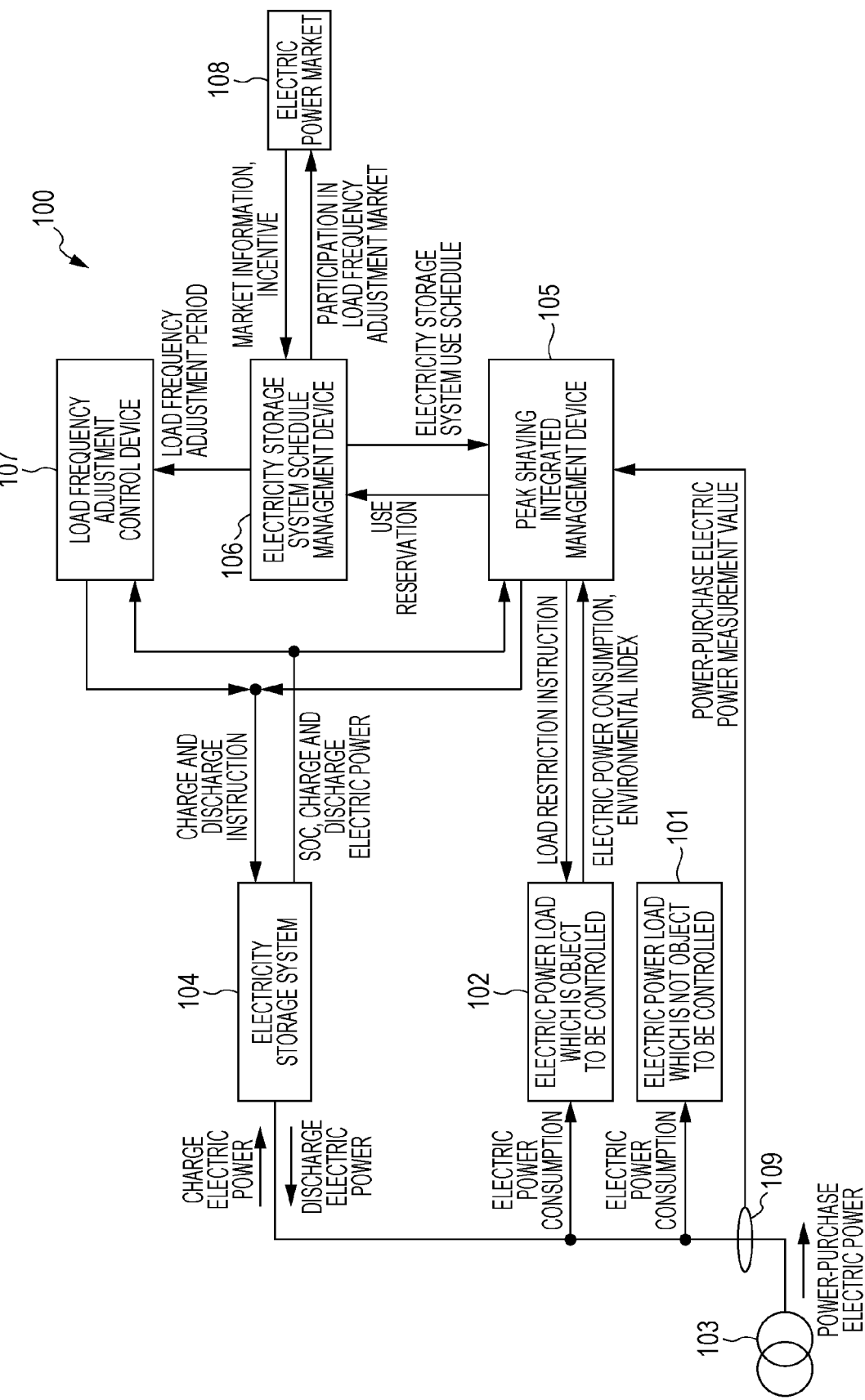
FIG. 1 is a diagram depicting a configuration example of a power-purchase electric power reduction system according to an embodiment.

In general, if the power-purchase electric power of a customer exceeds a target power-purchase electric power upper limit, the customer has to pay a high electric rate. Thus, by performing peak shaving that reduces the power-purchase electric power in such a way that the power-purchase electric power does not exceed the target power-purchase electric power upper limit, it is possible to suppress a peak of the power-purchase electric power which the customer purchases from a system power source and thereby lower the electric rate.

Moreover, by providing the customer with an electricity storage system, it is possible to participate in electric power services (such as a frequency adjustment service and a negawatt transaction) other than peak shaving and can get an incentive. Furthermore, by performing discharge from the electricity storage system, it is possible to operate an apparatus which is necessary for life even in the event of a power failure and improve convenience of the customer.

As described above, the electricity storage system also has usefulness other than peak shaving.

However, in the existing technique, the electricity storage system is often provided for a specific use. For example, in Japanese Unexamined Patent Application Publication No. 2012-95424, since the electricity storage system is provided to perform peak shaving, peak shaving is performed by using the electricity storage system with a higher priority given thereto than to an electrical apparatus. That is, in the existing technique, when there is a need to perform peak shaving, the electricity storage system cannot be used for electric power services other than peak shaving.

Therefore, in order to improve the general usefulness and economy of the electricity storage system, the inventors have conceived of obtaining an incentive from a load frequency adjustment control market and also dealing with an electric power load in the event of a power failure by using the electricity storage system not only for peak shaving, but also for other purposes such as a load frequency adjustment control service and backup. In this case, when the electricity storage system is used for a plurality of services, it is expected that a purpose in every predetermined time is determined in advance.

The inventors have found new problems that arise in the electric power control of the electricity storage system and the electric power load when a plurality of services are performed by using the electricity storage system and conceived of the means of solving the problems.

In an aspect of the present disclosure, an objective is to improve the general usefulness and economy as a system by making it possible to participate in another service by using an electricity storage system while performing peak shaving by using the electricity storage system. For this purpose, in the aspect of the present disclosure, load control is preferentially performed on an electric power load, and, if the power-purchase electric power still exceeds a target power-purchase electric power upper limit, the electricity storage system is used for peak shaving. In other cases, an objective is to provide a charge and discharge control method of an electricity storage system for making a distributed power source of, for example, an electricity storage system with high control capability actively participate in services other than peak shaving while suppressing a peak of the power-purchase electric power during a peak shaving period of a customer connected to a system power source by using the electricity storage system for another service.

In order to solve such a problem, the electric power control method according to the aspect of the present disclosure is an electric power control method for an electric power load and an electric power storage device including assigning one of a peak shaving control or other services to at least one of time slots that are divided by a specific time unit, obtaining a consumption power of the electric power load for each of the time slots, determining power-purchase electric power according to the consumption power, restricting a consumption power of the electric power load at one or more peak slots where the consumption power of the electric power load is more than or equal to a target power-purchase electric power upper limit, restricting the restricted consumption power of the electric power load and discharging the electric power storage device at one or more peak slots if the peak shaving is assigned.

When the electricity storage system is used for peak shaving and services other than peak shaving, it is possible to perform services other than peak shaving by using the electricity storage system and perform peak shaving (a power-purchase electric power reduction) using the electricity storage system when necessary.

For example, receiving an environmental index changing in accordance with output of the electric power load, and restricting the consumption power of the electric power load when the environmental index is within a predetermined range.

For example, discharging the electric power storage device and increasing the consumption power of the electric power load furthermore when the environmental index is outside the predetermined range.

For example, increasing the electric power consumption of the electric power load before the time slot in which the consumption power of the electric power load is more than or equal to a target power-purchase electric power upper limit.

For example, discharging the electric power storage device within a scope in which a remaining capacity required to perform the other service if the other service is assigned after the peak shaving in the peak slots.

For example, determining power-purchase electric power after the peak slots, and discharging the electric power storage device after the peak slots if power-purchase electric power is more than or equal to a target power-purchase electric power upper limit and the peak shaving is assigned.

For example, stopping restricting a consumption power of the electric power load after the slots where the consumption power of the electric power load is more than or equal to a target power-purchase electric power upper limit It should be noted that general or specific aspects may be implemented as a device, a system, a method, an integrated circuit, a computer program, a computer-readable recording medium such as a CD-ROM, or any selective combination thereof. For example, the electric power control device according to the aspect of the present disclosure is an electric power control device for an electric power load and an electric power storage device, the device includes one or more memories; and circuitry operative to: assign one of a peak shaving control or other services to at least one of time slots that are divided by a specific time unit; obtain a consumption power of the electric power load for each of the time slots; determine power-purchase electric power according to the consumption power; restrict a consumption power of the electric power load at one or more peak slots where the consumption power of the electric power load is more than or equal to a target power-purchase electric power upper limit; restrict the restricted consumption power of the electric power load and discharging the electric power storage device at one or more peak slots if the restricted consumption power of the electric power load is more than or equal to a target power-purchase electric power upper limit and the peak shaving is assigned.

Hereinafter, an embodiment of the present disclosure will be described in detail by using the drawings.

Incidentally, any embodiment which will be described below illustrates a comprehensive or specific example. The numerical values, shapes, component elements, placement positions and connection configurations of the component elements, steps of processing, order of steps, and so forth which will be described in the following embodiment are mere examples. Therefore, the present disclosure is not limited by these configurations. Moreover, of the component elements in the following embodiment, a component element which is not described in an independent claim describing the broadest concept of the present disclosure is described as an arbitrary component element.

Embodiment

FIG. 1 depicts a configuration example of a power-purchase electric power reduction system according to this embodiment.

In FIG. 1, a power-purchase electric power reduction system 100 includes an electric power load 101 which is not an object to be controlled, an electric power load 102 which is an object to be controlled, an electricity storage system 104, and a peak shaving integrated management device 105.

The electric power load 101 which is not an object to be controlled and is used by a customer, and the electric power load 102 which is an object to be controlled are connected to a system power source 103 and are driven by electric power which is supplied from the system power source 103. Moreover, the electric power load 101 which is not an object to be controlled and the electric power load 102 which is an object to be controlled are also connected to the electricity storage system 104 and are driven also by electric power which is supplied from the electricity storage system 104. Incidentally, here, descriptions are given on the assumption that, in the power-purchase electric power reduction system 100, there are one electric power load 101 which is not an object to be controlled and one electric power load 102 which is an object to be controlled, but a plurality of electric power loads 101, each being not an object to be controlled, and a plurality of electric power loads 102, each being an object to be controlled, may be included.

The electricity storage system 104 is provided in the customer and stores the electric power which is supplied from the system power source 103. Incidentally, the electricity storage system 104 does not necessarily have to be provided in the customer, and the customer may have part of a common electricity storage system which is provided outside the customer.

The peak shaving integrated management device 105 has responsibility for the peak shaving function, and the peak shaving integrated management device 105 generates a load restriction instruction to the electric power load 102 which is an object to be controlled when peak shaving is performed, generates a charge and discharge instruction to the electricity storage system 104, and determines whether or not a reservation for a schedule to use the electricity storage system 104 for the purpose of peak shaving is necessary. The peak shaving integrated management device 105 determines whether or not there is a possibility that the total amount of power-purchase electric power exceeds target electric power (a target power-purchase electric power upper limit) by predicting the electric power consumption of the electric power load 101 which is not an object to be controlled and the electric power load 102 which is an object to be controlled and determines whether or not peak shaving is performed. If the peak shaving integrated management device 105 determines that the implementation of peak shaving is necessary, the peak shaving integrated management device 105 provides at least one of a notification of a load restriction instruction to the electric power load 102 which is an object to be controlled and a notification of a discharge instruction to the electricity storage system 104, and performs control such that the power-purchase electric power does not exceed the target electric power. Moreover, the peak shaving integrated management device 105 determines whether or not there is a possibility that the total amount of future power-purchase electric power will exceed the target electric power by predicting the electric power consumption of the electric power load 101 which is not an object to be controlled and the electric power consumption of the electric power load 102 which is an object to be controlled and determines whether or not peak shaving by discharge from the electricity storage system 104 is necessary. If the peak shaving integrated management device 105 determines that future implementation of peak shaving by the electricity storage system 104 is necessary, the peak shaving integrated management device 105 notifies an electricity storage system schedule management device 106 of a use reservation request such that the electricity storage system 104 can be used for peak shaving in a slot about which the determination has been made by the peak shaving integrated management device 105 that the implementation of peak shaving is necessary therein.

The electricity storage system schedule management device 106 receives the use reservation request to use the electricity storage system 104 for peak shaving, the use reservation request sent from the peak shaving integrated management device 105, and determines whether or not the electricity storage system 104 is used for peak shaving in consideration of another service. If it is already determined that the period for which the reservation for use for peak shaving has been made is used for another service (for example, a load frequency adjustment service), the electricity storage system schedule management device 106 notifies the peak shaving integrated management device 105 that the electricity storage system 104 cannot be used for peak shaving and is scheduled to be used for a load frequency adjustment service. If the electricity storage system 104 can be used for peak shaving, the electricity storage system schedule management device 106 notifies the peak shaving integrated management device 105 of a schedule which allows the electricity storage system 104 to be used for peak shaving. The peak shaving integrated management device 105 holds the use schedule of the electricity storage system 104, the use schedule sent back from the electricity storage system schedule management device 106, in the peak shaving integrated management device 105.

When the other service, for example, a load frequency adjustment service is performed by using the electricity storage system 104, the electricity storage system schedule management device 106 takes part in the bidding in an electric power market 108 and notifies a load frequency adjustment control device 107 of information necessary for the implementation of the service, such as a period in which the electricity storage system 104 is used for load frequency adjustment control. The load frequency adjustment control device 107 performs charge and discharge control of the electricity storage system 104 in order to perform the load frequency adjustment control during the period of the load frequency adjustment control.

Figure 2:
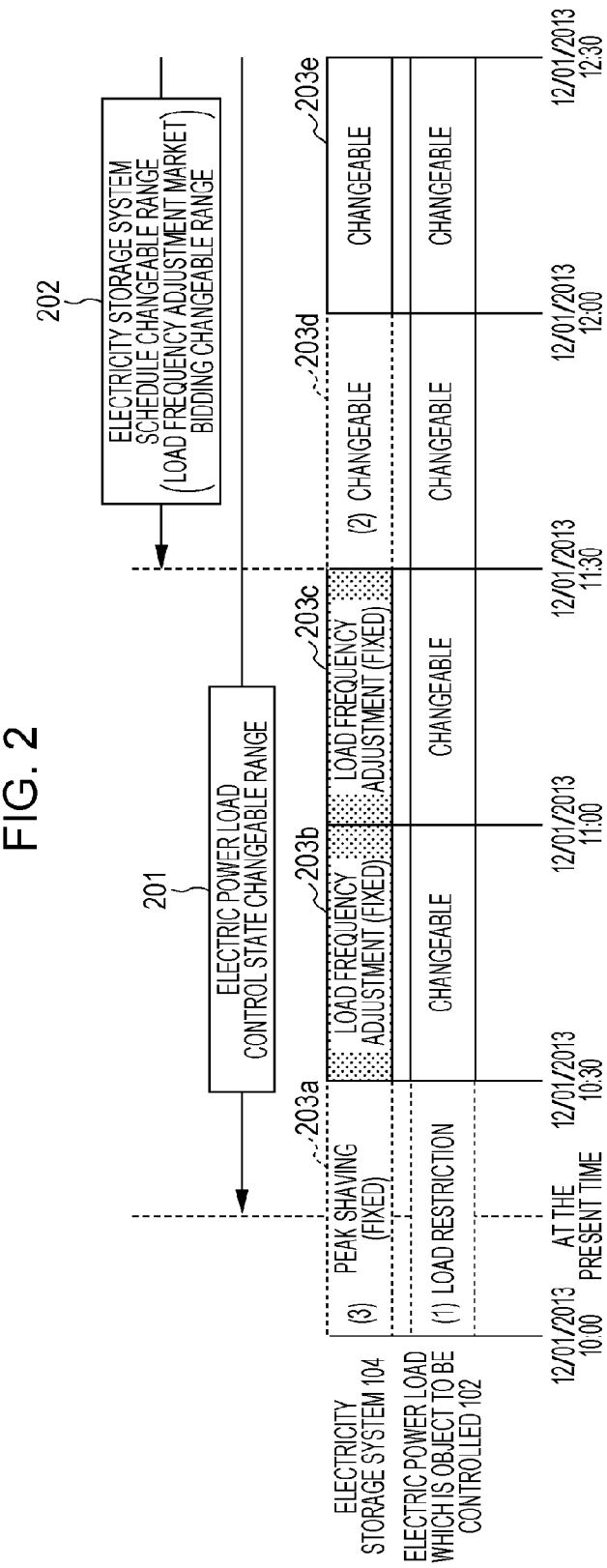
FIG. 2 is a diagram depicting an example of a control state of an electricity storage system and an electric power load in chronological order.

FIG. 2 is a diagram depicting an example of a control state of the electricity storage system 104 and the electric power load 102 which is an object to be controlled in chronological order.

When peak shaving is performed, objects on which apparatus control is actually performed are the electric power load 102 which is an object to be controlled and the electricity storage system 104. The electric power load 102 which is an object to be controlled is assumed to be an air-conditioning load, for example, and, by adjusting the set temperature of an indoor apparatus and putting a restriction on the electric power consumption of an outdoor apparatus, the electric power consumption is restricted. Incidentally, the electric power load 102 which is an object to be controlled may be lighting or the like and may be any apparatus as long as the electric power consumption of the apparatus can be restricted. Since the response speed and output resolution of the electric power load 102 which is an object to be controlled are lower than those of the electricity storage system 104 and therefore a fine output adjustment cannot be made, it is assumed that the electric power load 102 which is an object to be controlled cannot participate in an electric power service, such as a load frequency adjustment service, which is required to have high control capability and can participate only in an electric power service, such as peak shaving, which simply suppresses the electric power consumption. Therefore, when it is determined that peak shaving is necessary, the electric power load 102 which is an object to be controlled does not participate in other electric power services, and the peak shaving integrated management device 105 can start the implementation of a load restriction with arbitrary timing. If the current time is 12/01/2013 10:15, in a range 201 after 12/01/2013 10:15, the control state of the electric power load 102 which is an object to be controlled can be switched arbitrarily.

On the other hand, since the electricity storage system 104 is used not only for peak shaving, but also for another service such as a load frequency adjustment service, the prior scheduling of the use application is required. In particular, since services such as a load frequency adjustment service are offered to the outside such as an electric power market, it is assumed that a deadline for determination of a use application of a slot which is a predetermined time away, such as a deadline to submit a bid, is set and, if the deadline has passed, switching of the use application to another service becomes impossible. For example, if a deadline to submit a bid for a load frequency adjustment service is 60 minutes before the start of the service, in a range 202 after 12/01/2013 11:30, the use application of the electricity storage system 104 can be changed. In a slot 203e, since a change of the use application becomes impossible in the next slot, the use application of the electricity storage system 104 has to be determined in the current slot. Moreover, in slots 203a, 203b, and 203c, the use applications of the electricity storage system 104 have already been determined; in the slot 203a, the electricity storage system 104 is used for peak shaving and, in the slots 203b and 203c, the electricity storage system 104 is used for a load frequency adjustment service. In the slot 203a in which the electricity storage system 104 is used for peak shaving, in order to suppress the power-purchase electric power from the system power source 103, the electricity storage system 104 is made to perform discharge. Incidentally, here, for the purpose of description, descriptions have been given on the assumption that a deadline to submit a bid for a load frequency adjustment service is 60 minutes before the start of the service, but the example is not limited thereto.

Figure 3:
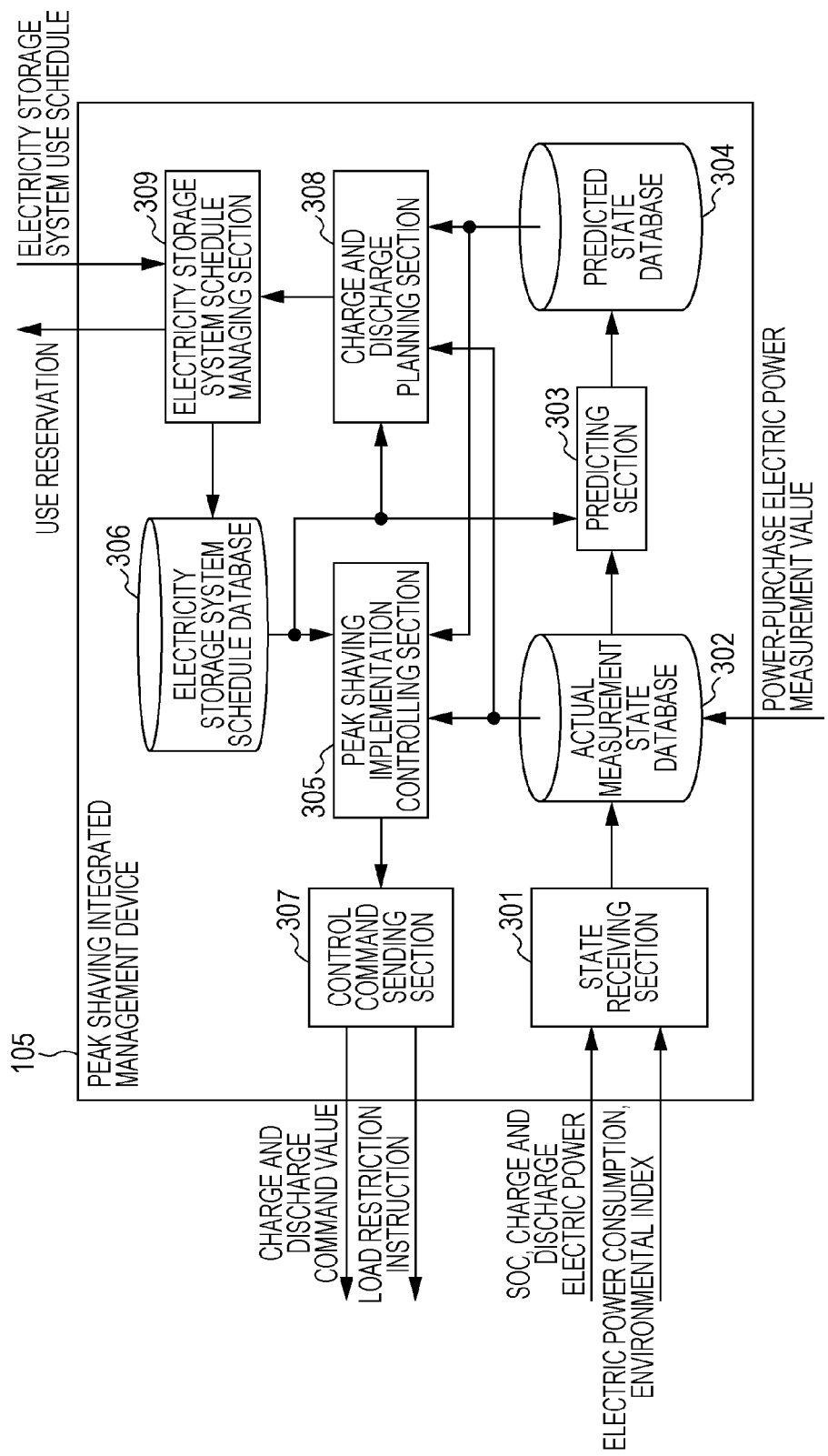
FIG. 3 is a diagram depicting a configuration example of a peak shaving integrated management device according to this embodiment.

FIG. 3 is a diagram depicting a configuration example of the peak shaving integrated management device 105 according to this embodiment.

The peak shaving integrated management device 105 includes a state receiving section 301, an actual measurement state database 302, a predicting section 303, a predicted state database 304, a peak shaving implementation controlling section 305, an electricity storage system schedule database 306, a control command sending section 307, a charge and discharge planning section 308, and an electricity storage system schedule managing section 309.

The state receiving section 301 receives the electric power consumption, the environmental index, the SOC, and the charge and discharge electric power from each of the electric power load 102 which is an object to be controlled and the electricity storage system 104 and holds them in the actual measurement state database 302. The environmental index is a value that determines the degree of intensity at which an electric power restriction can be performed on the electric power load 102 which is an object to be controlled, and examples thereof include a room temperature, for example. Incidentally, examples of the environmental index may include the humidity, the sensible temperature, the discomfort index, a predicted mean value (PMV), the amount of solar radiation, the number of people inside the room, and the $CO_2$ concentration. Moreover, the state receiving section 301 holds, in the actual measurement state database 302, a power-purchase electric power measurement value which is sent from a sensor 109 that measures the power-purchase electric power from the system power source 103. At this time, the electric power consumption of the electric power load 101 which is not an object to be controlled is calculated by using a power-purchase electric power amount measurement value, the charge and discharge electric power of the electricity storage system 104, and the electric power consumption of the electric power load 102 which is an object to be controlled, and the state receiving section 301 similarly holds the calculated electric power consumption in the actual measurement state database 302. Incidentally, the placement of various sensors 109 is not limited to this example and may be any placement; for example, a sensor that can directly measure the electric power consumption of the electric power load 101 which is not an object to be controlled may be attached.

Based on the electric power consumption of the electric power load 101 which is not an object to be controlled, the electric power consumption of the electric power load 102 which is an object to be controlled, the environmental index, and the SOC of the electricity storage system 104 which are held in the actual measurement state database 302 and the future use schedule of the electricity storage system 104 held in the electricity storage system schedule database 306, the predicting section 303 predicts future electric power consumption of the electric power load 101 which is not an object to be controlled, future electric power consumption of the electric power load 102 which is an object to be controlled, and future charge and discharge electric power of the electricity storage system 104. Moreover, the predicting section 303 predicts the power-purchase electric power from the system power source 103 as the sum of the future electric power consumption of the electric power load 101 which is not an object to be controlled, the future electric power consumption of the electric power load 102 which is an object to be controlled, and the future charge and discharge electric power of the electricity storage system 104 and holds the result in the predicted state database 304. The prediction method may be prediction by multiple regression, kernel regression, a time series analysis, a wavelet analysis, a neural network, pattern matching, or a filter or may be performed by a technique obtained by a combination thereof. Incidentally, as for this predicting section, the details thereof will be described by using FIG. 4.

The peak shaving implementation controlling section 305 generates a load restriction instruction to the electric power load 102 which is an object to be controlled and a charge and discharge command value for the electricity storage system 104 in such a way as to suppress a peak of the power-purchase electric power from the system power source 103 in the current slot. The peak shaving implementation controlling section 305 acquires the power-purchase electric power of the system power source 103, the SOC of the electricity storage system 104, and the environmental index from the actual measurement state database 302, the power-purchase electric power predicted value from the predicted state database 304, and the use schedule of the electricity storage system 104 from the electricity storage system schedule database 306, generates a load restriction instruction to the electric power load 102 which is an object to be controlled and a charge and discharge command value for the electricity storage system 104, and sends the load restriction instruction and the charge and discharge command value to the electric power load 102 which is an object to be controlled and the electricity storage system 104, respectively, via the control command sending section 307. Incidentally, the charge and discharge command value for the electricity storage system 104 may be sent only when the electricity storage system 104 can be used for peak shaving in the current slot. The details about the generation of the load restriction instruction to the electric power load 102 which is an object to be controlled and the charge and discharge command value for the electricity storage system 104 will be described later by using FIG. 4.

In the charge and discharge planning section 308, it is determined whether or not there is a need to use the electricity storage system 104 for peak shaving in a future slot. The charge and discharge planning section 308 simulates an operation which is observed when the peak shaving implementation controlling section 305 performs peak shaving in the future slot and, when it is predicted that a high peak of the power-purchase electric power from the system power source 103 will appear if a use reservation for the electricity storage system 104 is not made for peak shaving, sends a notification to the electricity storage system schedule managing section 309 to make a reservation such that the electricity storage system 104 can be used for peak shaving. Incidentally, even when a high peak of the power-purchase electric power does not appear, when the SOC is at or below a predetermined criterion and charge is necessary to perform another service, the charge and discharge planning section 308 may send a notification to the electricity storage system schedule managing section 309 to make a reservation such that the electricity storage system 104 can be used for peak shaving.

The electricity storage system schedule managing section 309 makes a request to the electricity storage system schedule management device 106 to make a reservation for a slot for which a reservation request has been received from the charge and discharge planning section 308, such that the electricity storage system 104 can be used for peak shaving. Moreover, the electricity storage system schedule managing section 309 receives a notification of the use schedule of the electricity storage system 104 from the electricity storage system schedule management device 106 and holds the use schedule in the electricity storage system schedule database 306. At this time, even a slot for which a reservation request has been made such that the electricity storage system 104 can be used for peak shaving may not be able to use the electricity storage system 104 for peak shaving when, for example, a higher priority is given to another service. On the other hand, to even a slot for which a reservation request has not been made such that the electricity storage system 104 is used for peak shaving, a schedule that allows the electricity storage system 104 to be used for peak shaving may be sent when the electricity storage system 104 is not scheduled to be used for another service.

FIG. 4 is a diagram depicting a flowchart that generates an electric power restriction command for the electric power load 102 which is an object to be controlled and a charge and discharge command value for the electricity storage system 104 when peak shaving is performed. Incidentally, the processing depicted in this flowchart is performed on a regular basis.

First, it is determined whether or not the current environmental index has increased and become more than or equal to a threshold value (S401). If it is determined that the current environmental index has increased and become more than or equal to the threshold value (Yes in S401), the electric power restriction on the electric power load 102 which is an object to be controlled is relaxed (S402). This means, for example, when the output of an air-conditioning apparatus is restricted rather severely and it is determined that the output restriction on the air-conditioning apparatus is not acceptable because a sense of discomfort is increased due to the room air temperature exceeding 30° C., for example, the room temperature is lowered by increasing the cooling capacity by relaxing the output restriction on the air-conditioning apparatus and the comfort is regained. That is, relaxing the electric power restriction means that easing the electric power restriction and indicates an increase in the output of the electric power load 102 which is an object to be controlled. Relaxing the electric power restriction may be implemented by setting the electric power restriction to the state at the time of ordinary use (without an electric power restriction) or may be implemented by returning the electric power restriction to the value of an electric power restriction before the start of peak shaving, and the mode thereof is not limited to these examples. Incidentally, when the electric power restriction is not put on the electric power load 102 which is an object to be controlled, the procedure proceeds to S406 without sending a control command to the electric power load 102 which is an object to be controlled.

If it is determined that the current environmental index is less than or equal to the threshold value (No in S401), it is determined whether or not the power-purchase electric power predicted value of the current slot exceeds the target electric power (S403). The power-purchase electric power predicted value of the current slot means the amount of power-purchase electric power of the current slot which is predicted when the present control state of the electric power load 102 which is an object to be controlled and the present control state of the electricity storage system 104 are maintained. If the predicted power-purchase electric power exceeds the target electric power (Yes in S403), the electric power restriction on the electric power load 102 which is an object to be controlled is tightened (S404) and the amount of power-purchase electric power is suppressed. Incidentally, stages are provided for the electric power restriction which is put on the electric power load 102 which is an object to be controlled, and the electric power restriction may not be tightened to be a stage higher than a given electric power restriction. When the predicted value of the power-purchase electric power exceeds the target electric power and peak shaving is necessary, the electric power restriction on the electric power load 102 which is an object to be controlled is tightened before the electricity storage system 104 and the use of the electricity storage system 104 for the purpose of peak shaving is reduced as much as possible, and an attempt to achieve peak shaving as much as possible with the electric power restriction on the electric power load 102 which is an object to be controlled is made.

If it is determined that the power-purchase electric power predicted value of the current slot does not exceed the target electric power (No in S403), if it is determined that the electricity storage system 104 is reserved for the purpose of peak shaving in the current slot and the SOC is less than or equal to the threshold value and charge is necessary (Yes in S405), the electric power restriction on the electric power load 102 which is an object to be controlled is tightened such that charge can be completed as quickly as possible (S404) with the intention of increasing the scope of electric power in which the electricity storage system 104 can be charged within a scope which does not allow the power-purchase electric power predicted value to exceed the target electric power, such that the electricity storage system 104 can be used for services other than peak shaving as quickly as possible by putting a restriction on the electric power of the electric power load 102 which is an object to be controlled.

If it is determined that, in the current slot, the electricity storage system 104 is not reserved for the purpose of peak shaving or the SOC is more than or equal to the threshold value and charge is not necessary (No in S405), the electric power restriction on the electric power load 102 which is an object to be controlled is relaxed (S402). Since the power-purchase electric power is less than or equal to the target electric power and there is no need to give consideration to charge of the electricity storage system 104, there is no motivation for putting an electric power restriction on the electric power load 102 which is an object to be controlled. Therefore, when an electric power restriction is put on the electric power load 102 which is an object to be controlled, the electric power restriction is relaxed in order to improve the environmental index. When the electric power restriction is removed in the air-conditioning apparatus or the like, since the electric power consumption temporarily increases greatly as a reaction, the electric power restriction is relaxed in such a way that the power-purchase electric power does not exceed the target electric power as a reaction. The electric power restriction is relaxed to a range in which an electric power restriction is not put.

Then, if it is determined that the schedule of the electricity storage system 104 in the current slot is not peak shaving (No in S406), since the electricity storage system 104 cannot be used for peak shaving, the generation of a charge and discharge command is not performed. If it is determined that the schedule of the electricity storage system 104 in the current slot is peak shaving (Yes in S406), it is determined whether or not the power-purchase electric power predicted value of the current slot exceeds the target electric power (S407). Incidentally, the power-purchase electric power predicted value here is a predicted value which is set with consideration given to the control state of the electric power load 102 which is an object to be controlled with the electric power restriction controlled in S402 or S404. That is, in a state in which the electric power restriction is put on the electric power load 102 which is an object to be controlled, it is determined whether or not the power-purchase electric power predicted value exceeds the target electric power.

If it is determined that the predicted value of the power-purchase electric power still exceeds the target electric power (Yes in S407), a discharge command is generated such that the power-purchase electric power predicted value does not exceed the target electric power, and the electricity storage system 104 is made to perform discharge (S408). Here, even when large electric power consumption is generated as a reaction as a result of the electric power restriction on the electric power load 102 which is an object to be controlled being relaxed since the environmental index has increased and become more than or equal to the threshold value, since a determination is made such that the electricity storage system 104 is made to perform discharge, the environmental index is maintained and, as the same time, peak shaving is performed. On the other hand, if it is determined that the predicted value of the power-purchase electric power does not exceed the target electric power with consideration given to the control state of the electric power load 102 which is an object to be controlled (No in S407), it is determined whether or not the current SOC of the electricity storage system 104 is less than or equal to the threshold value (S409). If it is determined that the current SOC of the electricity storage system 104 is less than or equal to the threshold value (Yes in S409), a charge command is generated such that the current SOC reaches the threshold value within a scope which does not allow the power-purchase electric power predicted value to exceed the target electric power and the electricity storage system 104 is charged (S410). If it is determined that the current SOC is already more than or equal to the threshold value (No in S409), since there is no motivation for charging or discharging the electricity storage system 104, a command to stop the charge and discharge command is generated and the charge and discharge of the electricity storage system 104 are stopped (S411). Since this processing is performed repeatedly, after the completion of S408, S410, or S411, the processing after S401 is performed again.

As described above, when peak shaving is necessary or the electricity storage system 104 requires charging, by actively suppressing the load of the electric power load 102 which is an object to be controlled, it is possible to shorten a period in which the electricity storage system 104 performs discharge and has to be used for peak shaving as much as possible while ensuring the sufficient capability of peak shaving. Incidentally, since a period in which the electricity storage system 104 has to be used for peak shaving is lengthened if the environmental index declines, when it is expected that peak shaving will be necessary, the environmental index may be improved in advance by stepping up the operation of the electric power load 102 which is an object to be controlled within a scope which does not allow the power-purchase electric power to exceed the target electric power. This means that, for example, by lowering the set temperature of the air-conditioning apparatus which requires peak shaving about 30 minutes before a time at which peak shaving is expected to be required, although the electric power consumption of the air-conditioning apparatus is restricted during peak shaving and the room temperature rises, a period in which the room temperature is within an acceptable range can be lengthened.

Incidentally, as for the above-mentioned switching of the control state, in order to avoid unnecessary fluctuations of the control state, once the control state is switched, for example, the state after switching may be kept for a given time. For example, the generation of an electric power restriction command for the electric power load 102 which is an object to be controlled and a charge and discharge command value for the electricity storage system 104 in FIG. 4 may be repeatedly performed with arbitrary timing such as at intervals of 10 minutes.

Moreover, descriptions have been given by using, as a criterion of determination for the environmental index, a determination as to whether the environmental index is more than or equal to a threshold value or is less than or equal to the threshold value, bur the criterion of determination for the environmental index may be a determination as to whether the environmental index is within a predetermined range with upper and lower limits or outside the predetermined range.

As a result, it is possible to use the electricity storage system 104 not only for peak shaving, but also for other purposes such as a load frequency adjustment control service and backup and get an incentive from the load frequency adjustment control market. That is, it is possible to improve the general usefulness and economy as a system by making it possible to participate in another service by using the electricity storage system 104 while performing peak shaving by using the electricity storage system 104.

FIGS. 5A to 5D are diagrams, each depicting an example of peak shaving according to this embodiment.

FIG. 5A is a diagram depicting an example in which, in peak shaving according to this embodiment, the power-purchase electric power is prevented from exceeding the target electric power only by an electric power restriction which is put on an electric power load.

Part (a) of FIG. 5A illustrates a power-purchase electric power predicted value in each slot, target electric power, an environmental index predicted value, and a threshold value for an environmental index when no command is sent to the electric power load 102 which is an object to be controlled and the electricity storage system 104 and peak shaving is not performed. The target electric power is a value which is set by the customer based on a peak target of the power-purchase electric power, and the target electric power may be a predetermined value which is set in advance by a contract with the system power source 103 or a value which is set from an achievable range based on an actual achievement value of the power-purchase electric power, the charge and discharge capacity of the electricity storage system 104, and so forth and is not limited to these examples. Likewise, the threshold value for the environmental index is a value which is set based on a range acceptable to the customer, and the threshold value for the environmental index may be a room temperature 30° C. or a PMV 2.0 and is not limited to these examples.

When peak shaving control is not performed, the power-purchase electric power predicted values in a slot of 12:30 to 13:00 and a slot of 13:00 to 13:30 exceed the target electric power. Therefore, the objective is to suppress the power-purchase electric power predicted values in these two slots and reduce the power-purchase electric power predicted values so as to be less than or equal to the target electric power.

Part (b) of FIG. 5A is a diagram depicting an example of peak shaving according to this embodiment in the same period as the period of the part (a) of FIG. 5A.

First, in a slot of 12:30 to 13:00, an electric power restriction is put on the electric power load 102 which is an object to be controlled such that the power-purchase electric power predicted value does not exceed the target electric power. By putting the electric power restriction, it is possible to reduce the power-purchase electric power predicted value so as to be less than or equal to the target electric power, but the environmental index predicted value increases accordingly. However, the environmental index predicted value is less than or equal to the threshold value and is acceptable. Moreover, when the power-purchase electric power predicted value can be suppressed so as to be less than or equal to the target electric power only by the electric power restriction, discharge from the electricity storage system 104 is not necessary and the electricity storage system 104 can be used for other services such as a load frequency adjustment. Likewise, as for a slot of 13:00 to 13:30, an electric power restriction is put on the electric power load 102 which is an object to be controlled and the power-purchase electric power predicted value is suppressed so as to be less than or equal to the target electric power. In a slot of 13:30 to 14:00, since the electric power consumption is reduced, there is no motivation for actively putting an electric power restriction on the electric power load 102 which is an object to be controlled in order to suppress the power-purchase electric power predicted value so as to be less than or equal to the target electric power, but, if no electric power restriction is put on the electric power load 102 which is an object to be controlled, the electric power consumption increases greatly as a reaction. For this reason, an electric power restriction is performed while being relaxed, whereby a reaction is suppressed. Likewise, as for a slot of 14:00 to 14:30, the electric power restriction is relaxed within a scope which does not allow the power-purchase electric power predicted value to exceed the target electric power.

As a result, in the example of the part (b) of FIG. 5A, in the slots of 12:30 to 13:00 and 13:00 to 13:30, the power-purchase electric power predicted values can be suppressed so as to be less than or equal to the target electric power, and, as for the slots that follow, it is possible to suppress the power-purchase electric power predicted values so as to be less than or equal to the target electric power. Since peak shaving can be performed only by an electric power restriction which is put on the electric power load, there is no need to reserve the electricity storage system 104 for peak shaving, and the electricity storage system 104 can be used for other services such as a load frequency adjustment.

Figure 5B:
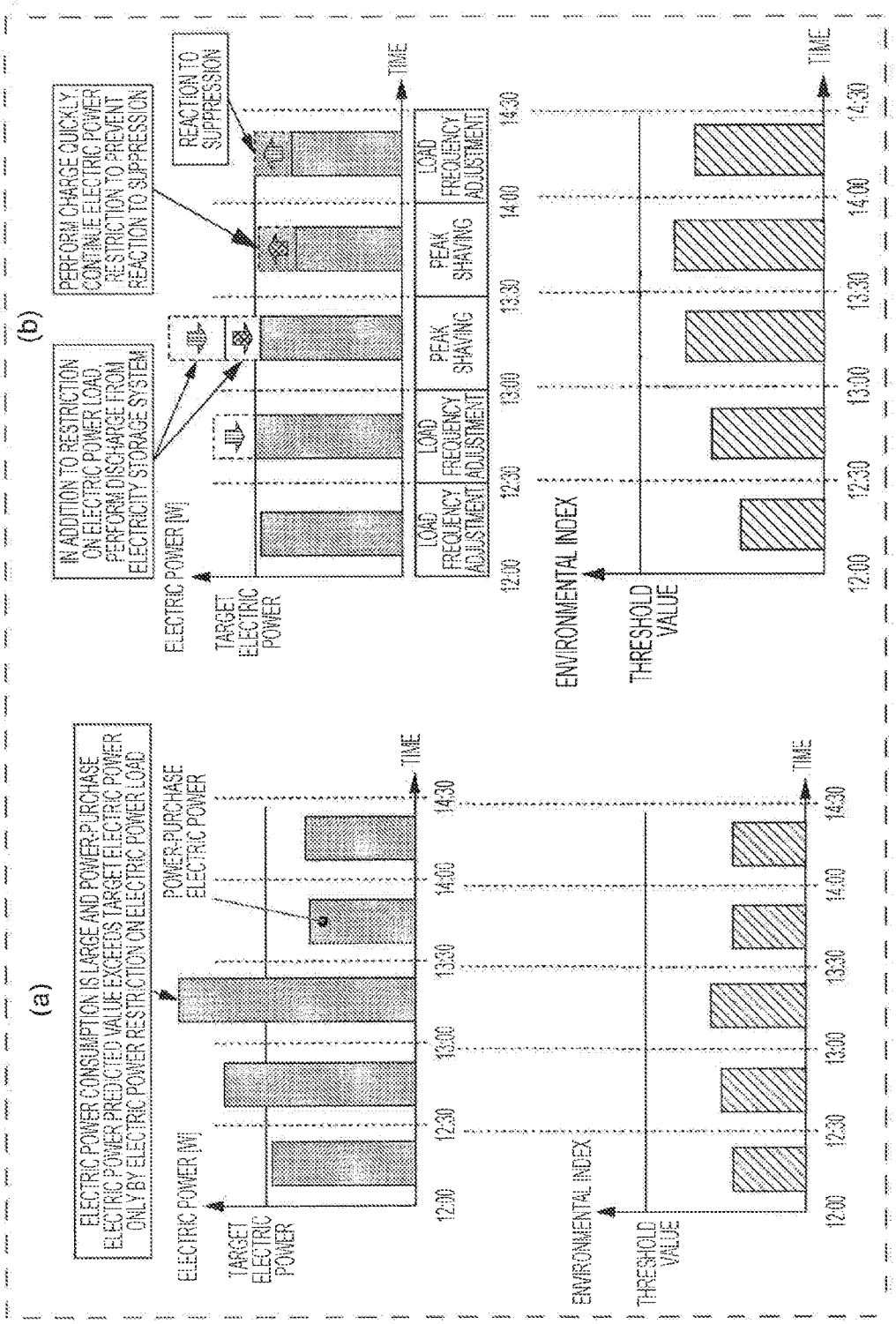
FIG. 5B is a diagram depicting an example of peak shaving according to this embodiment.

FIG. 5B is a diagram depicting an example in which, in peak shaving according to this embodiment, the power-purchase electric power predicted value exceeds the target electric power greatly and is suppressed by an electric power restriction on the electric power load 102 which is an object to be controlled and discharge from the electricity storage system 104.

In part (a) of FIG. 5B, the power-purchase electric power predicted value in a slot of 13:00 to 13:30 exceeds the target electric power greatly and the power-purchase electric power predicted value still exceeds the target electric power only by an electric power restriction which is put on the electric power load.

Part (b) of FIG. 5B is a diagram depicting an example of peak shaving according to this embodiment in the same period as the period of the part (a) of FIG. 5B.

In a slot of 12:30 to 13:00, an electric power restriction is put on the electric power load 102 which is an object to be controlled such that the power-purchase electric power predicted value is not allowed to exceed the target electric power. Likewise, as for a slot of 13:00 to 13:30, an electric power restriction is first put on the electric power load 102 which is an object to be controlled and an attempt to suppress the power-purchase electric power predicted value so as to be less than or equal to the target electric power is made. However, since it is impossible to suppress the power-purchase electric power predicted value so as to be less than or equal to the target electric power only by an electric power restriction, the power-purchase electric power predicted value is suppressed so as to be less than or equal to the target electric power by performing discharge from the electricity storage system 104. In a slot of 13:30 to 14:00, since the electric power consumption is reduced, there is no need for control to suppress the power-purchase electric power predicted value actively and charge of the electricity storage system 104 is preferentially performed. In so doing, since the power-purchase electric power predicted value exceeds the target electric power if the electric power restriction on the electric power load is removed, the electric power restriction is continuously performed. In a slot of 14:00 to 14:30, since charge of the electricity storage system 104 is not necessary, the electric power restriction is relaxed within a scope which does not allow the power-purchase electric power predicted value to exceed the target electric power. In so doing, since, in the two slots of 13:00 to 14:00, the electricity storage system 104 has to be used for peak shaving, a use reservation for peak shaving is made in advance.

As a result, in the example of the part (b) of FIG. 5B, in the slots of 12:30 to 13:00 and 13:00 to 13:30, the power-purchase electric power predicted values can be suppressed so as to be less than or equal to the target electric power, and, as for the slots that follow, it is possible to suppress the power-purchase electric power predicted values so as to be less than or equal to the target electric power. By giving a higher priority to charge of the electricity storage system 104 than to a relaxation of the electric power restriction on the electric power load while suppressing the power-purchase electric power predicted value so as to be less than or equal to the target electric power by performing discharge also from the electricity storage system 104, it is possible to charge the electricity storage system 104 quickly to the required amount and use the electricity storage system 104 for another service.

Incidentally, when the power-purchase electric power predicted value exceeds the target electric power if the electric power restriction on the electric power load 102 which is an object to be controlled is removed after 13:30, the power-purchase electric power predicted value may be suppressed so as to be less than or equal to the target electric power by making the electricity storage system 104 perform discharge.

Figure 5C:
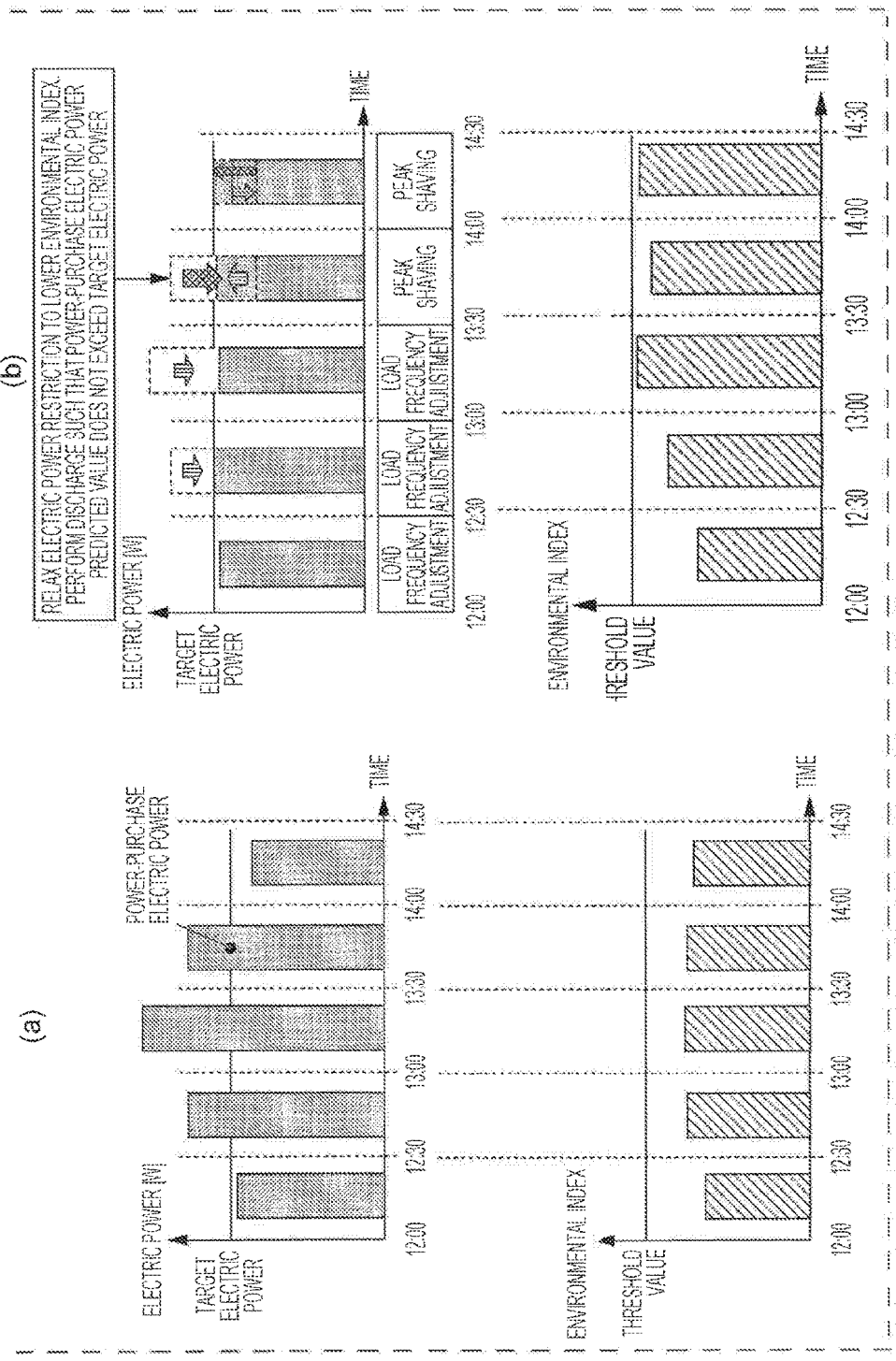
FIG. 5C is a diagram depicting an example of peak shaving according to this embodiment.

FIG. 5C is a diagram depicting an example in which, in peak shaving according to this embodiment, the power-purchase electric power predicted value exceeds the target electric power for a long duration and the power-purchase electric power predicted value is suppressed so as to be less than or equal to the target electric power with discharge from the electricity storage system 104 being performed in order to maintain the environmental index predicted value.

In part (a) of FIG. 5C, since the power-purchase electric power predicted values in slots of 12:30 to 14:00 exceed the target electric power and the environmental index predicted values are also relatively high, if the power-purchase electric power predicted values are suppressed only by an electric power restriction which is put on the electric power load, the environmental index predicted values exceed the threshold value.

Part (b) of FIG. 5C is a diagram depicting an example of peak shaving according to this embodiment in the same period as the period of the part (a) of FIG. 5C.

In slots of 12:30 to 13:00 and 13:00 to 13:30, an electric power restriction is put on the electric power load 102 which is an object to be controlled such that the power-purchase electric power predicted values are not allowed to exceed the target electric power. As for these two slots, even when an electric power restriction is performed, the environmental index predicted values do not exceed the threshold value. However, as for a slot of 13:30 to 14:00, the electric power restriction on the electric power load 102 which is an object to be controlled is relaxed in order to maintain or lower the environmental index predicted value such that the environmental index predicted value is not allowed to exceed the threshold value. Here, as the aim of control of the electric power load 102 which is an object to be controlled, peak shaving is the secondary aim and preventing the environmental index predicted value from exceeding the threshold value is the primary aim. That is, peak shaving is performed by discharge from the electricity storage system 104 so as not to allow the power-purchase electric power predicted value to exceed the target electric power with the environmental index predicted value being prevented from becoming more than or equal to the threshold value. In a slot of 14:00 to 14:30, the electric power consumption is reduced and there is no motivation for performing control to suppress the power-purchase electric power predicted value actively. At this time, since the environmental index predicted value is less than or equal to the threshold value, charge of the electricity storage system 104 is performed and electric power control of the electric power load 102 which is an object to be controlled is enhanced.

As a result, in the example of the part (b) of FIG. 5C, it is possible to suppress the power-purchase electric power predicted values so as to be less than or equal to the target electric power in the slots of 12:30 to 14:30 and avoid the environmental index predicted values from becoming more than or equal to the threshold value. Moreover, by reducing discharge of the electricity storage system 104 and giving high priority to charge thereof when the environmental index predicted value is less than or equal to the threshold value, it is possible to shorten a period in which the electricity storage system 104 is used for peak shaving and use the electricity storage system 104 for another service shortly after peak shaving (after 14:30 in the part (b) of FIG. 5C).

Incidentally, at this time, since it is known in advance that the electricity storage system 104 is used for the other service immediately after peak shaving, when the electricity storage system 104 is used for the other service immediately after peak shaving, charge and discharge of the electricity storage system 104 may be performed within a scope in which the remaining capacity required of the electricity storage system 104 is satisfied.

FIG. 5D is a diagram depicting an example in which, in peak shaving according to this embodiment, an electric power load which is an object to be controlled is controlled before the power-purchase electric power predicted value exceeds the target electric power and the environmental index predicted value is lowered in advance, whereby the power-purchase electric power predicted value is suppressed so as to be less than or equal to the target electric power only by the control of the electric power load which is an object to be controlled.

In part (a) of FIG. 5D, since the power-purchase electric power predicted values in slots of 12:30 to 14:00 exceed the target electric power and the environmental index predicted values are also relatively high, if the power-purchase electric power predicted values are suppressed only by an electric power restriction which is put on the electric power load, the environmental index predicted values exceed the threshold value. Incidentally, a comparison between the part (a) of FIG. 5D and the part (a) of FIG. 5C reveals that the power-purchase electric power predicted value in 12:00 to 12:30 in the part (a) of FIG. 5D is lower than the power-purchase electric power predicted value in 12:00 to 12:30 in the part (a) of FIG. 5C.

Part (b) of FIG. 5D is a diagram depicting an example of peak shaving according to this embodiment in the same period as the period of the part (a) of FIG. 5D.

Since the power-purchase electric power predicted value is low in a slot of 12:00 to 12:30 and it is expected that the power-purchase electric power predicted value will exceed the target electric power from this time forward, the electric power load 102 which is an object to be controlled is controlled in advance and the environmental index predicted value is lowered. As a result, even when an electric power restriction is put on the electric power load 102 which is an object to be controlled in slots of 12:30 to 14:00, the environmental index predicted values do not become more than or equal to the threshold value without discharge from the electricity storage system 104. The operation is the same as the operation in FIG. 5A except that the environmental index predicted value is lowered in advance.

As a result, in the example of the part (b) of FIG. 5D, it is possible to suppress the power-purchase electric power predicted values so as to be less than or equal to the target electric power in the slots of 12:30 to 14:30 and avoid the environmental index predicted values from becoming more than or equal to the threshold value. Moreover, by lowering the environmental index predicted value in advance, there is no need to use the electricity storage system 104 for peak shaving and the electricity storage system 104 can be used for another service at all times.

Up to this point, by using FIGS. 1 to 5D, the electric power control method of the electric power control device according to this embodiment, the electric power control method of the electric power control device that reduces the power-purchase electric power, has been described.

With this method, it is possible to perform peak shaving that suppresses the power-purchase electric power so as to be less than or equal to the target value while keeping the environmental index predicted value within a given range. Moreover, by reducing discharge from the electricity storage system and preferentially performing charge thereof, it is possible to shorten a period in which the electricity storage system is used for peak shaving and use the electricity storage system effectively for various purposes.

As a result, it is possible to use the electricity storage system not only for peak shaving, but also for other purposes such a load frequency adjustment control service and backup and get an incentive from the load frequency adjustment control market. That is, it is possible to improve the general usefulness and economy as a system by making it possible to participate in another service by using the electricity storage system while performing peak shaving by using the electricity storage system.

The electric power control method according to the present disclosure can be applied to an electric power control device that reduces the power-purchase electric power by using an electric power load and an electricity storage system.

What is claimed is:

1. An electric power control method for an electric power load and an electric power storage device disposed in a customer's electrical system, the method comprising:
    assigning one of a peak shaving control or an other service to at least one of time slots that are divided by a specific time unit;
    obtaining a consumption power of the electric power load of each of the time slots;
    determining power-purchase electric power according to the consumption power of each of the time slots;
    restricting a consumption power of the electric power load in a peak time slot, in which the consumption power of the electric power load is more than or equal to a target power-purchase electric power upper limit; and
    restricting the restricted consumption power of the electric power load and discharging the electric power storage device in the peak time slot, when the restricted consumption power of the electric power load is more than or equal to the target power-purchase electric power upper limit and the peak shaving is assigned.

2. The electric power control method according to claim 1, further comprising:
    receiving an environmental index changing in accordance with an output of the electric power load, and
    restricting the consumption power of the electric power load, when the environmental index is within a predetermined range.

3. The electric power control method according to claim 2, further comprising discharging the electric power storage device and increasing the consumption power of the electric power load, when the environmental index is outside the predetermined range.

4. The electric power control method according to claim 2, wherein
    the environmental index is a value that determines a degree of intensity at which an electric power restriction can be performed on the electric power load, and
    the environmental index includes at least one of a temperature, a humidity, a sensible temperature, a discomfort index, a predicted mean value, an amount of solar radiation, a number of people inside a room, and a $CO_2$ concentration.

5. The electric power control method according to claim 2, wherein
    after the environmental index is received, it is determined whether or not the environmental index is within the predetermined range,
    when it is determined that the environmental index is within the predetermined range, the peak time slot is determined, and
    the consumption power is restricted in the determined peak time slot, when it is determined that the environmental index is within the predetermined range.

6. The electric power control method according to claim 1, wherein the electric power consumption of the electric power load is increased before the peak time slot, in which the consumption power of the electric power load is more than or equal to the target power-purchase electric power upper limit.

7. The electric power control method according to claim 1, wherein the electric power storage device is discharged within a scope in which a remaining capacity required to perform the other service, when the other service is assigned after the peak shaving in the peak time slot.

8. The electric power control method according to claim 1, wherein the power-purchase electric power is determined after the peak time slot, and the electric power storage device is discharged after the peak time slot, when the determined power-purchase electric power is more than or equal to the target power-purchase electric power upper limit and the peak shaving is assigned.

9. The electric power control method according to claim 1, further comprising stopping restricting the consumption power of the electric power load after the peak time slot, in which the consumption power of the electric power load is more than or equal to the target power-purchase electric power upper limit.

10. The electric power control method according to claim 1, wherein a system power source and the electric power storage device are capable of supplying electric power to the electric power load,
    when the restricted consumption power of the electric power load is more than or equal to the target power-purchase electric power upper limit in the peak time slot and the peak shaving is assigned, the electric power discharged by the electric power storage device is supplied to the electric power load to reduce the electric power supplied from the system power source to the electric power load.

11. An electric power control device for an electric power load and an electric power storage device, the electric power control device comprising:
at least one memory; and circuitry operative to:
assign one of a peak shaving control or an other service to at least one of time slots that are divided by a specific time unit;
obtain a consumption power of the electric power load of each of the time slots;
determine power-purchase electric power according to the consumption power of each of the time slots;
restrict a consumption power of the electric power load in a peak time slot, in which the consumption power of the electric power load is more than or equal to a target power-purchase electric power upper limit; and
restrict the restricted consumption power of the electric power load and discharging the electric power storage device in the peak time slot, when the restricted consumption power of the electric power load is more than or equal to the target power-purchase electric power upper limit and the peak shaving is assigned.

* * * * *